US012799719B2

(12) United States Patent
Yamamoto et al.

(10) Patent No.: US 12,799,719 B2
(45) Date of Patent: Nov. 17, 2026

(54) HYDRAULIC SYSTEM

(71) Applicant: KAWASAKI JUKOGYO KABUSHIKI KAISHA, Kobe (JP)

(72) Inventors: Ryo Yamamoto, Kobe (JP); Hideki Tanaka, Kobe (JP); Hiroaki Mitsui, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 15 days.

(21) Appl. No.: 18/993,470

(22) PCT Filed: Apr. 19, 2023

(86) PCT No.: PCT/JP2023/015570
§ 371 (c)(1),
(2) Date: Jan. 10, 2025

(87) PCT Pub. No.: WO2024/014083
PCT Pub. Date: Jan. 18, 2024

(65) Prior Publication Data

US 2026/0022717 A1 Jan. 22, 2026

(30) Foreign Application Priority Data

Jul. 11, 2022 (JP) ................................ 2022-111246

(51) Int. Cl.
*E02F 9/22* (2006.01)
*F15B 7/10* (2006.01)

(52) U.S. Cl.
CPC .......... *E02F 9/2292* (2013.01); *E02F 9/2232* (2013.01); *E02F 9/2289* (2013.01);
(Continued)

(58) Field of Classification Search
CPC .............. F15B 7/10; F15B 2211/20546; F15B 2211/20561; F15B 2211/20576;
(Continued)

(56) References Cited

U.S. PATENT DOCUMENTS

| | | | | |
|---|---|---|---|---|
| 2,927,429 A * | 3/1960 | Carlson | ................... | E05F 15/50<br>60/903 |
| 3,158,167 A * | 11/1964 | Redelman | ................. | F15B 7/10<br>137/87.03 |

(Continued)

FOREIGN PATENT DOCUMENTS

| | | |
|---|---|---|
| JP | 2002-021807 A | 1/2002 |
| JP | 2002-054602 A | 2/2002 |
| JP | 2013-245740 A | 12/2013 |

*Primary Examiner* — Matthew Wiblin
(74) *Attorney, Agent, or Firm* — Oliff PLC

(57) ABSTRACT

A hydraulic system according to one embodiment includes: a first bi-directional pump connected to a head-side chamber of a single-rod cylinder by a head-side line and connected to a rod-side chamber of the single-rod cylinder by a rod-side line, the first bi-directional pump being a variable displacement pump; and a second bi-directional pump connected to the head-side line by a supply/discharge line, the second bi-directional pump being a variable displacement pump. The hydraulic system further includes: a low-pressure selection valve connected to the head-side line by a first discharge line and connected to the rod-side line by a second discharge line; and a position detector that detects a position of the low-pressure selection valve.

9 Claims, 9 Drawing Sheets

(52) U.S. Cl.
CPC .............. *E02F 9/2296* (2013.01); *F15B 7/10* (2013.01); *F15B 2211/20546* (2013.01); *F15B 2211/20561* (2013.01); *F15B 2211/20576* (2013.01)

(58) Field of Classification Search
CPC ..... E02F 9/2232; E02F 9/2289; E02F 9/2292; E02F 9/2296
See application file for complete search history.

(56) References Cited

U.S. PATENT DOCUMENTS

| | | | | |
|---|---|---|---|---|
| 4,520,626 | A * | 6/1985 | Nakajima | F15B 7/10 60/475 |
| 6,263,670 | B1 * | 7/2001 | Gluck | F16H 61/4104 60/494 |
| 10,655,740 | B2 * | 5/2020 | Shimizu | F15B 11/08 |
| 10,982,761 | B2 * | 4/2021 | Mitsui | F15B 7/006 |
| 2006/0070377 | A1 * | 4/2006 | Last | F15B 7/02 60/475 |
| 2007/0204608 | A1 * | 9/2007 | Von Baumen | F04B 15/02 60/476 |
| 2008/0072589 | A1 * | 3/2008 | Jacobs | F15B 21/14 60/473 |
| 2009/0064676 | A1 * | 3/2009 | Tikkanen | F15B 7/006 60/592 |
| 2010/0293937 | A1 * | 11/2010 | Ramm | F15B 7/10 60/431 |
| 2014/0366519 | A1 * | 12/2014 | Sadamori | E02F 9/2289 60/430 |
| 2015/0107236 | A1 | 4/2015 | Udagawa et al. | |
| 2016/0153556 | A1 * | 6/2016 | Kenkel | F16K 11/07 137/1 |
| 2018/0251960 | A1 * | 9/2018 | Takahashi | F15B 20/00 |
| 2019/0072178 | A1 * | 3/2019 | Gepraegs | F16H 61/4104 |
| 2022/0056667 | A1 * | 2/2022 | Saitoh | E02F 9/2292 |

* cited by examiner

HYDRAULIC SYSTEM

CROSS-REFERENCE TO RELATED APPLICATIONS

This is a U.S. National Phase Application of PCT/JP2023/015570 filed on Apr. 19, 2023, which designates the United States and claims priority to Japanese Patent Application No. 2022-111246, filed on Jul. 11, 2022, the entire contents of which are incorporated herein by reference.

TECHNICAL FIELD

The present disclosure relates to a hydraulic system for a single-rod cylinder.

BACKGROUND ART

Conventionally, there is a known hydraulic system for a single-rod cylinder, the hydraulic system including a bi-directional pump that is connected to the single-rod cylinder in a manner to form a closed circuit. For example, Patent Literature 1 discloses a hydraulic system 100 as shown in FIG. 9.

The hydraulic system 100 includes a first bi-directional pump 110 and a second bi-directional pump 120. The first bi-directional pump 110 is connected to a head-side chamber 210 of a single-rod cylinder 200 by a head-side line 111, and is connected to a rod-side chamber 220 of the single-rod cylinder 200 by a rod-side line 112. The second bi-directional pump 120 is a pump with which to eliminate a flow rate difference between the head-side chamber 210 and the rod-side chamber 220 of the single-rod cylinder 200 (i.e., a difference between an inflow flow rate and an outflow flow rate), and is connected to the head-side line 111 by a supply/discharge line 121.

The first bi-directional pump 110 and the second bi-directional pump 120 are driven in the same direction by an electric motor 130. To be more specific, at the time of extending the single-rod cylinder 200 (i.e., at the time of moving the rod forward), the electric motor 130 drives the first bi-directional pump 110 and the second bi-directional pump 120 in a first direction, and at the time of retracting the single-rod cylinder 200 (i.e., at the time of moving the rod backward), the electric motor 130 drives the first bi-directional pump 110 and the second bi-directional pump 120 in a second direction opposite to the first direction. When the first bi-directional pump 110 and the second bi-directional pump 120 are driven in the first direction, these pumps deliver a hydraulic liquid to the head-side chamber 210, and when the first bi-directional pump 110 and the second bi-directional pump 120 are driven in the second direction, these pumps suck the hydraulic liquid from the head-side chamber 210. Further, in the hydraulic system 100, the second bi-directional pump 120 is a variable displacement pump, and the displacement of the second bi-directional pump 120 is changed by a regulator 140.

In the hydraulic system 100, assuming that the displacement of the second bi-directional pump 120 when there is neither excess nor deficiency in the inflow flow rate to the single-rod cylinder 200 or in the outflow flow rate from the single-rod cylinder 200 is a reference displacement, then in a case where, at the time of extending the single-rod cylinder 200, the displacement of the second bi-directional pump 120 is greater than the reference displacement, pressure confinement occurs on either the rod side (the rod-side chamber 220 and the rod-side line 112) or the head side (the head-side chamber 210 and the head-side line 111), whichever side has a lower pressure. On the other hand, in a case where, at the time of extending the single-rod cylinder 200, the displacement of the second bi-directional pump 120 is less than the reference displacement, cavitation occurs on either the rod side or the head side, whichever side has a lower pressure. Further, at the time of retracting the single-rod cylinder 200, in a case where the displacement of the second bi-directional pump 120 is greater than the reference displacement, cavitation occurs on either the rod side or the head side, whichever side has a lower pressure, and in a case where the displacement of the second bi-directional pump 120 is less than the reference displacement, pressure confinement occurs on either the rod side or the head side, whichever side has a lower pressure. The regulator 140 is controlled based on the pressure of the head-side chamber 210 or the rod-side chamber 220 of the single-rod cylinder 200 to suppress the pressure confinement or the cavitation.

CITATION LIST

Patent Literature

PTL 1: Japanese Laid-Open Patent Application Publication No. 2013-245740

PTL 2: Japanese Laid-Open Patent Application Publication No. 2002-54602

SUMMARY OF INVENTION

Technical Problem

As described above, in the hydraulic system 100 of Patent Literature 1, the occurrence of pressure confinement on either the rod side or the head side, whichever side has a lower pressure, is suppressed by performing control. In this respect, there is a desire to physically prevent the occurrence of pressure confinement on either the rod side or the head side, whichever side has a lower pressure.

FIG. 2 of Patent Literature 2 discloses, as a conventional technique, a hydraulic circuit in which only one bi-directional pump is used for a single-rod cylinder, and the hydraulic circuit adopts a low-pressure selection valve that makes it possible to discharge a hydraulic liquid to a tank from either a head-side line or a rod-side line, whichever line has a lower pressure (in Patent Literature 2, the low-pressure selection valve is referred to as a "flushing valve"). However, in this hydraulic circuit, unlike in the hydraulic system 100 of Patent Literature 1, a second bi-directional pump is not added to a first bi-directional pump.

In view of the above, an object of the present disclosure is to provide a hydraulic system that makes it possible to, in a configuration in which a second bi-directional pump is added to a first bi-directional pump, physically prevent the occurrence of pressure confinement on either the rod side or the head side, whichever side has a lower pressure.

Solution to Problem

The present disclosure provides a hydraulic system for a single-rod cylinder including a head-side chamber and a rod-side chamber, the hydraulic system including: a first bi-directional pump connected to the head-side chamber by a head-side line and connected to the rod-side chamber by a rod-side line, the first bi-directional pump being a variable displacement pump; a second bi-directional pump connected to the head-side line by a supply/discharge line, the second bi-directional pump being a variable displacement pump; an electric motor that drives the first bi-directional pump and the second bi-directional pump in a same direction; a low-pressure selection valve connected to the head-side line by a first discharge line and connected to the rod-side line by a second discharge line, wherein when a pressure difference between a pressure of the head-side chamber and a pressure of the rod-side chamber is less than a threshold, the low-pressure selection valve is in a neutral position in which the low-pressure selection valve blocks the first discharge line and the second discharge line, and when the pressure of the head-side chamber is higher than the pressure of the rod-side chamber by the threshold or greater, the low-pressure selection valve is switched to a rod-side discharge position in which the low-pressure selection valve allows the second discharge line to communicate with a relief line on which a relief valve is located, whereas when the pressure of the rod-side chamber is higher than the pressure of the head-side chamber by the threshold or greater, the low-pressure selection valve is switched to a head-side discharge position in which the low-pressure selection valve allows the first discharge line to communicate with the relief line; and a position detector that detects whether a position of the low-pressure selection valve is the neutral position, the rod-side discharge position, or the head-side discharge position.

Advantageous Effects of Invention

The present disclosure provides a hydraulic system that makes it possible to, in a configuration in which a second bi-directional pump is added to a first bi-directional pump, physically prevent the occurrence of pressure confinement on either the rod side or the head side, whichever side has a lower pressure.

DESCRIPTION OF EMBODIMENTS

Figure 1:
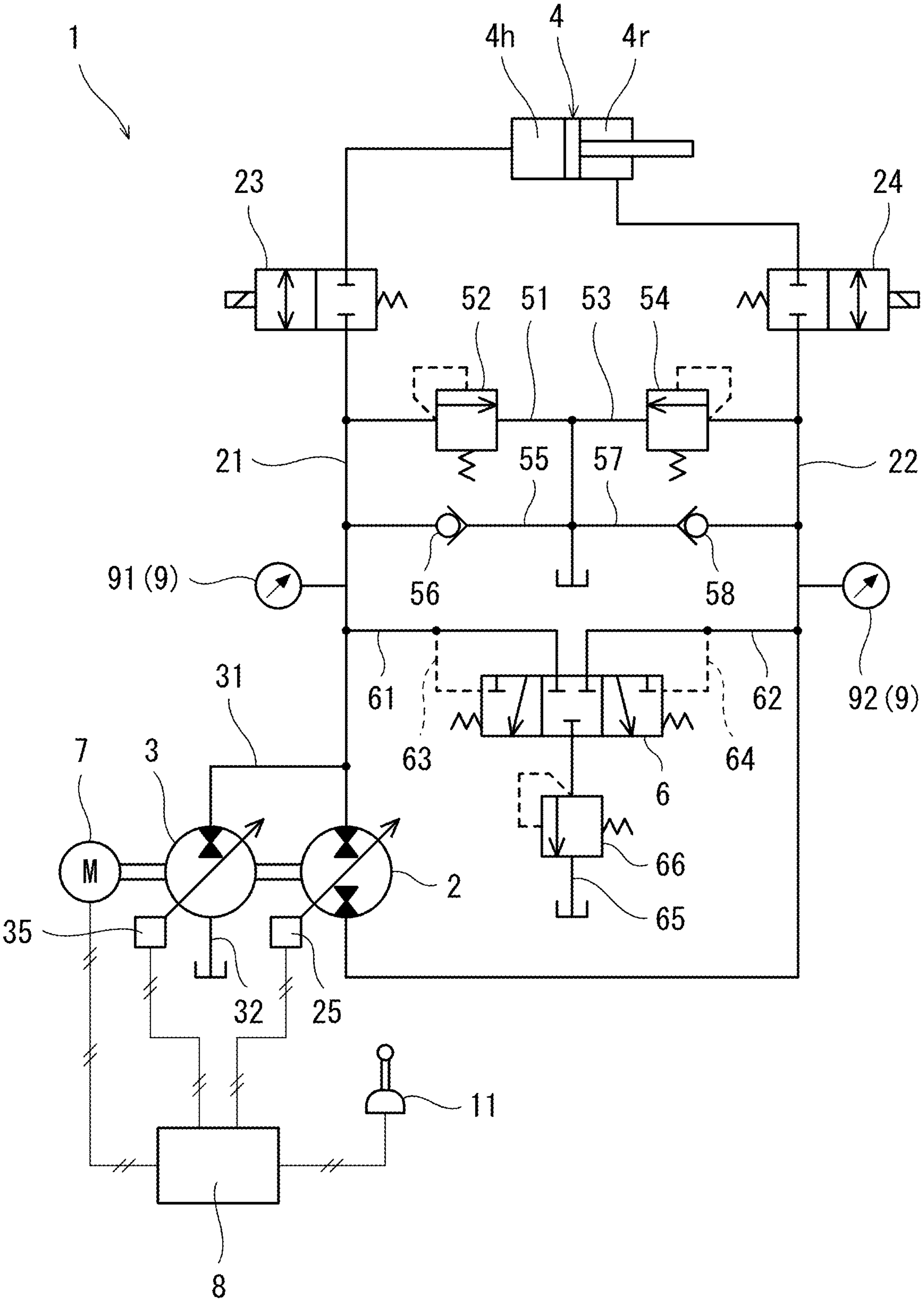
FIG. 1 shows a schematic configuration of a hydraulic system according to one embodiment.

FIG. 1 shows a hydraulic system 1 according to one embodiment. The hydraulic system 1 is a hydraulic system for a single-rod cylinder 4. The single-rod cylinder 4 includes a head-side chamber 4*h* and a rod-side chamber 4*r*. Typically, a hydraulic liquid used in the hydraulic system 1 is oil.

Specifically, the hydraulic system 1 includes: a first bi-directional pump 2, which is connected to the single-rod cylinder 4 in a manner to form a closed circuit; and a second bi-directional pump 3, with which to eliminate a flow rate difference between the head-side chamber 4*h* and the rod-side chamber 4*r* of the single-rod cylinder 4 (i.e., a difference between an inflow flow rate and an outflow flow rate).

The first bi-directional pump 2 is connected to the head-side chamber 4*h* of the single-rod cylinder 4 by a head-side line 21, and connected to the rod-side chamber 4*r* of the single-rod cylinder 4 by a rod-side line 22. The second bi-directional pump 3 is connected to the head-side line 21 by a first supply/discharge line 31, and connected to a tank by a second supply/discharge line 32.

A first lock valve 23, which is an on-off valve, is located on the head-side line 21. A second lock valve 24, which is an on-off valve, is located on the rod-side line 22. The first lock valve 23 and the second lock valve 24 are controlled by control circuitry 8. In FIG. 1, the illustration of part of signal lines is omitted for the purpose of simplifying the drawing.

The control circuitry 8 opens the first lock valve 23 and the second lock valve 24 when moving (extending or retracting) the single-rod cylinder 4. Except when moving (extending or retracting) the single-rod cylinder 4, the control circuitry 8 closes the first lock valve 23 and the second lock valve 24. By thus closing the first lock valve 23 and the second lock valve 24, movement of the single-rod cylinder 4 can be locked.

A head-side relief line 51 is branched off from the head-side line 21, and the head-side relief line 51 connects to the tank. A head-side relief valve 52, whose relief pressure is set relatively high (e.g., 25 to 35 MPa), is located on the head-side relief line 51.

Further, a first bypass line 55, which bypasses the head-side relief valve 52, is branched off from the head-side line 21. The first bypass line 55 connects to the tank. A first check valve 56, which allows a flow from the tank to the head-side line 21, but prevents the reverse flow, is located on the first bypass line 55.

In the illustrated example, the head-side relief line 51 and the first bypass line 55 are branched off from the head-side line 21 between the first lock valve 23 and the first bi-directional pump 2. Alternatively, the head-side relief line 51 and the first bypass line 55 may be branched off from the head-side line 21 between the first lock valve 23 and the single-rod cylinder 4. Further alternatively, the first bypass line 55 need not be branched off from the head-side line 21, but may be branched off from the head-side relief line 51 at a position upstream of the head-side relief valve 52.

Similarly, a rod-side relief line 53 is branched off from the rod-side line 22, and the rod-side relief line 53 connects to the tank. A rod-side relief valve 54, whose relief pressure is set relatively high (e.g., 25 to 35 MPa), is located on the rod-side relief line 53.

Further, a second bypass line 57, which bypasses the rod-side relief valve 54, is branched off from the rod-side line 22. The second bypass line 57 connects to the tank. A second check valve 58, which allows a flow from the tank to the rod-side line 22, but prevents the reverse flow, is located on the second bypass line 57.

In the illustrated example, the rod-side relief line 53 and the second bypass line 57 are branched off from the rod-side line 22 between the second lock valve 24 and the first bi-directional pump 2. Alternatively, the rod-side relief line 53 and the second bypass line 57 may be branched off from the rod-side line 22 between the second lock valve 24 and the single-rod cylinder 4. Further alternatively, the second bypass line 57 need not be branched off from the rod-side line 22, but may be branched off from the rod-side relief line 53 at a position upstream of the rod-side relief valve 54.

Since the head-side relief line 51 and the rod-side relief line 53 are thus located, a pressure Ph of the head-side chamber 4*h* and a pressure Pr of the rod-side chamber 4*r* can be kept lower than or equal to a setting pressure of the head-side relief valve 52 and the rod-side relief valve 54. Further, since the first bypass line 55 and the second bypass line 57 are thus located, the occurrence of cavitation on either the head side (the head-side chamber 4*h* and the head-side line 21) or the rod side (the rod-side chamber 4*r* and the rod-side line 22), whichever side has a lower pressure, can be suppressed by replenishing the head-side line 21 or the rod-side line 22 with the hydraulic liquid via the first check valve 56 or the second check valve 58.

Each of the first bi-directional pump 2 and the second bi-directional pump 3 is, for example, an axial piston pump (a swash plate pump or a bent axis pump) Also, each of the first bi-directional pump 2 and the second bi-directional pump 3 is a variable displacement pump.

The displacement of the first bi-directional pump 2 is changed by a first regulator 25, and the displacement of the second bi-directional pump 3 is changed by a second regulator 35. The first regulator 25 and the second regulator 35 are controlled by the control circuitry 8. For example, in a case where the first bi-directional pump 2 is a swash plate pump, the first regulator 25 may electrically change a hydraulic pressure applied to a servo piston coupled to the swash plate of the first bi-directional pump 2, or may be an electric actuator coupled to the swash plate of the first bi-directional pump 2. Similarly, in a case where the second bi-directional pump 3 is a swash plate pump, the second regulator 35 may electrically change a hydraulic pressure applied to a servo piston coupled to the swash plate of the second bi-directional pump 3, or may be an electric actuator coupled to the swash plate of the second bi-directional pump 3.

The first bi-directional pump 2 and the second bi-directional pump 3 are driven in the same direction by an electric motor 7. The first bi-directional pump 2 and the second bi-directional pump 3 may be located such that their center axes are coaxial with each other (i.e., tandem type), or such that their center axes are parallel to each other (i.e., parallel type).

The electric motor 7 is controlled by the control circuitry 8. At the time of extending the single-rod cylinder 4, the electric motor 7 drives the first bi-directional pump 2 and the second bi-directional pump 3 in a first direction, and at the time of retracting the single-rod cylinder 4, the electric motor 7 drives the first bi-directional pump 2 and the second bi-directional pump 3 in a second direction opposite to the first direction. When the first bi-directional pump 2 and the second bi-directional pump 3 are driven in the first direction, these pumps deliver the hydraulic liquid to the head-side chamber 4*h*, and when the first bi-directional pump 2 and the second bi-directional pump 3 are driven in the second direction, these pumps suck the hydraulic liquid from the head-side chamber 4*h*.

Further, the present embodiment adopts a low-pressure selection valve 6, which is connected to the head-side line 21 by a first discharge line 61 and connected to the rod-side line 22 by a second discharge line 62. The low-pressure selection valve 6 is connected to the tank by a low-pressure relief line 65. A low-pressure relief valve 66, whose relief pressure is set relatively low (e.g., 0.1 to 2 MPa), is located on the low-pressure relief line 65.

The low-pressure selection valve 6 is switched between a neutral position (middle position in FIG. 1), a head-side discharge position (right-side position in FIG. 1), and a rod-side discharge position (left-side position in FIG. 1). When the low-pressure selection valve 6 is in the neutral position, the low-pressure selection valve 6 blocks the first discharge line 61 and the second discharge line 62. When the low-pressure selection valve 6 is in the head-side discharge position, the low-pressure selection valve 6 allows the first discharge line 61 to communicate with the low-pressure relief line 65 while blocking the second discharge line 62. When the low-pressure selection valve 6 is in the rod-side discharge position, the low-pressure selection valve 6 allows the second discharge line 62 to communicate with the low-pressure relief line 65 while blocking the first discharge line 61.

The pressure Ph of the head-side chamber 4*h* is led to the low-pressure selection valve 6 through a first pilot line 63, and the pressure Pr of the rod-side chamber 4*r* is led to the low-pressure selection valve 6 through a second pilot line 64. The first pilot line 63 is a pilot line with which to switch the low-pressure selection valve 6 from the neutral position to the rod-side discharge position, and the second pilot line 64 is a pilot line with which to switch the low-pressure selection valve 6 from the neutral position to the head-side discharge position. In the illustrated example, the first pilot line 63 and the second pilot line 64 are branched off from the first discharge line 61 and the second discharge line 62, respectively. Alternatively, the first pilot line 63 may be branched off from the head-side line 21, and also, the second pilot line 64 may be branched off from the rod-side line 22.

When a pressure difference ΔP between the pressure Ph of the head-side chamber 4*h* and the pressure Pr of the rod-side chamber 4*r* ($\Delta P=|Ph-Pr|$) is less than a threshold Pt, the low-pressure selection valve 6 is in the neutral position. On the other hand, when the pressure Ph of the head-side chamber 4*h* has become higher than the pressure Pr of the rod-side chamber 4*r* by the threshold Pt or greater, the low-pressure selection valve 6 is switched from the neutral position to the rod-side discharge position, and when the pressure Pr of the rod-side chamber 4*r* has become higher than the pressure Ph of the head-side chamber 4*h* by the threshold Pt or greater, the low-pressure selection valve 6 is switched from the neutral position to the head-side discharge position. For example, the threshold Pt is within the range of 0.5 to 3 MPa. The threshold Pt at the time of extending the cylinder and the threshold Pt at the time of retracting the cylinder may be different from each other.

The hydraulic system 1 further includes a position detector 9, which detects whether the position of the low-pressure selection valve 6 is the neutral position, the rod-side discharge position, or the head-side discharge position. The position detector 9 is electrically connected to the control circuitry 8.

In the present embodiment, the position detector 9 includes: a pressure sensor 91, which measures the pressure Ph of the head-side chamber 4*h*; a pressure sensor 92, which measures the pressure Pr of the rod-side chamber 4*r*; and an arithmetic processor. When $|Ph-Pr|<Pt$, the arithmetic processor determines that the position of the low-pressure selection valve 6 is the neutral position. When $Ph-Pr\geq Pt$, the arithmetic processor determines that the position of the low-pressure selection valve 6 is the rod-side discharge position. When Pr−Ph ≥Pt, the arithmetic processor determines that the position of the low-pressure selection valve 6 is the head-side discharge position. The arithmetic processor may be incorporated in the control circuitry 8.

In the illustrated example, the pressure sensor 91 and the pressure sensor 92 are located on the head-side line 21 and the rod-side line 22, respectively. Alternatively, the pressure sensor 91 and the pressure sensor 92 may be located on the head-side chamber **4*h* and the rod-side chamber 4*r*, respectively. Further alternatively, instead of the two pressure sensors, the position detector 9 may include a stroke sensor located on the low-pressure selection valve 6**.

Next, the control of the electric motor 7, the first regulator 25, and the second regulator 35 by the control circuitry 8 is described in detail. Regarding the control circuitry 8, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The control circuitry 8 receives an input of a first operation signal and an input of a second operation signal. The first operation signal is an extension command to the single-rod cylinder 4, and the second operation signal is a retraction command to the single-rod cylinder 4. The present embodiment adopts an operator 11, which includes an operating lever to be operated by a user. The first operation signal and the second operation signal are inputted from the operator 11 to the control circuitry 8. However, in the case of performing unmanned operation, the operator 11 may be eliminated, and the first operation signal and the second operation signal may be inputted to the control circuitry 8 from an unmanned system.

In the present embodiment, an angle of the operating lever of the operator 11 determines a moving speed of the single-rod cylinder 4. Accordingly, each of the first operation signal and the second operation signal includes a speed command to the single-rod cylinder 4. Alternatively, each of the first operation signal and the second operation signal may include no speed command, and at the time of extension and at the time of retraction, the single-rod cylinder 4 may move at a constant speed.

(Cylinder Extension)

Figure 2:
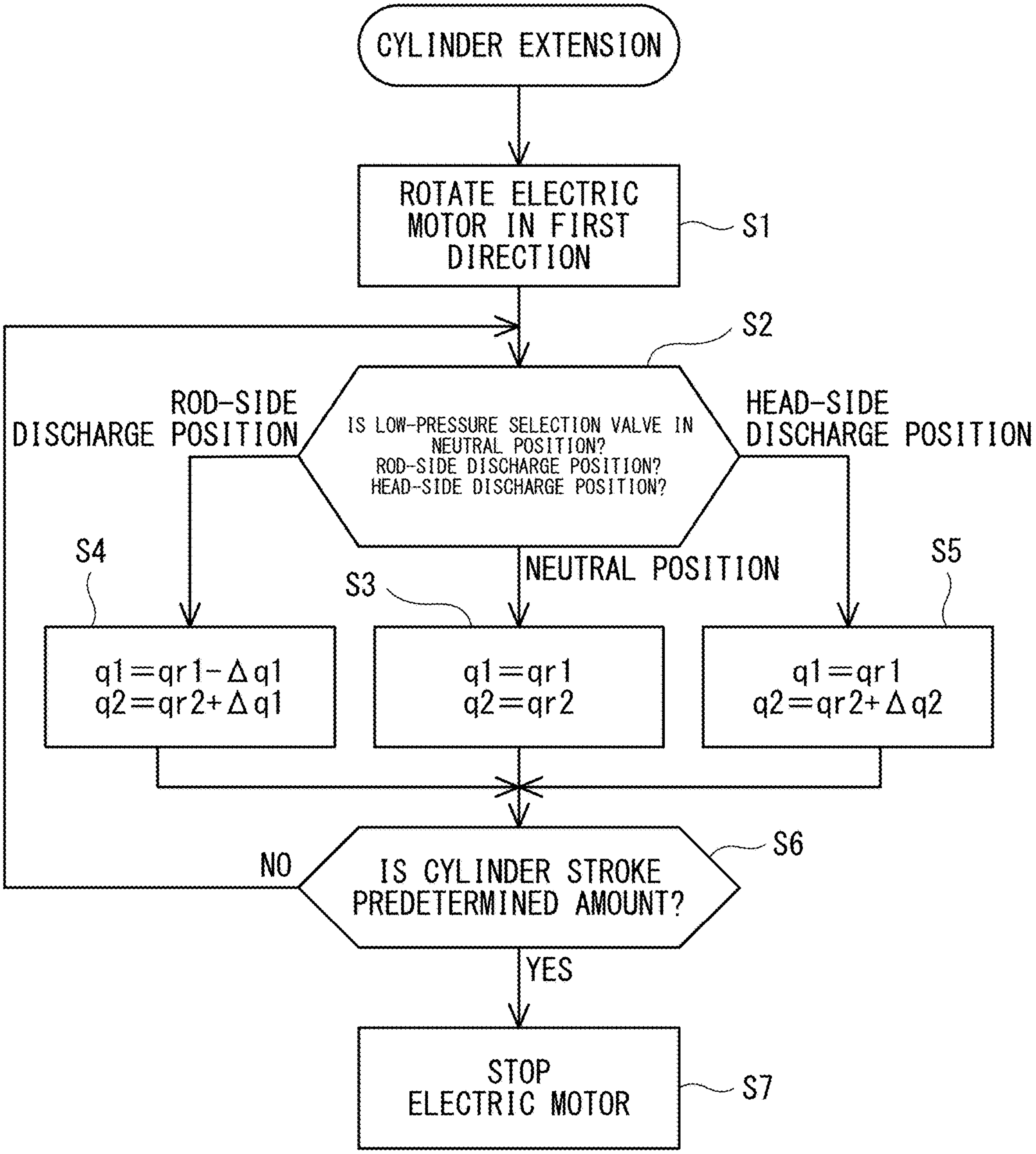
FIG. 2 is a flowchart at the time of extending a cylinder.
Figure 3:
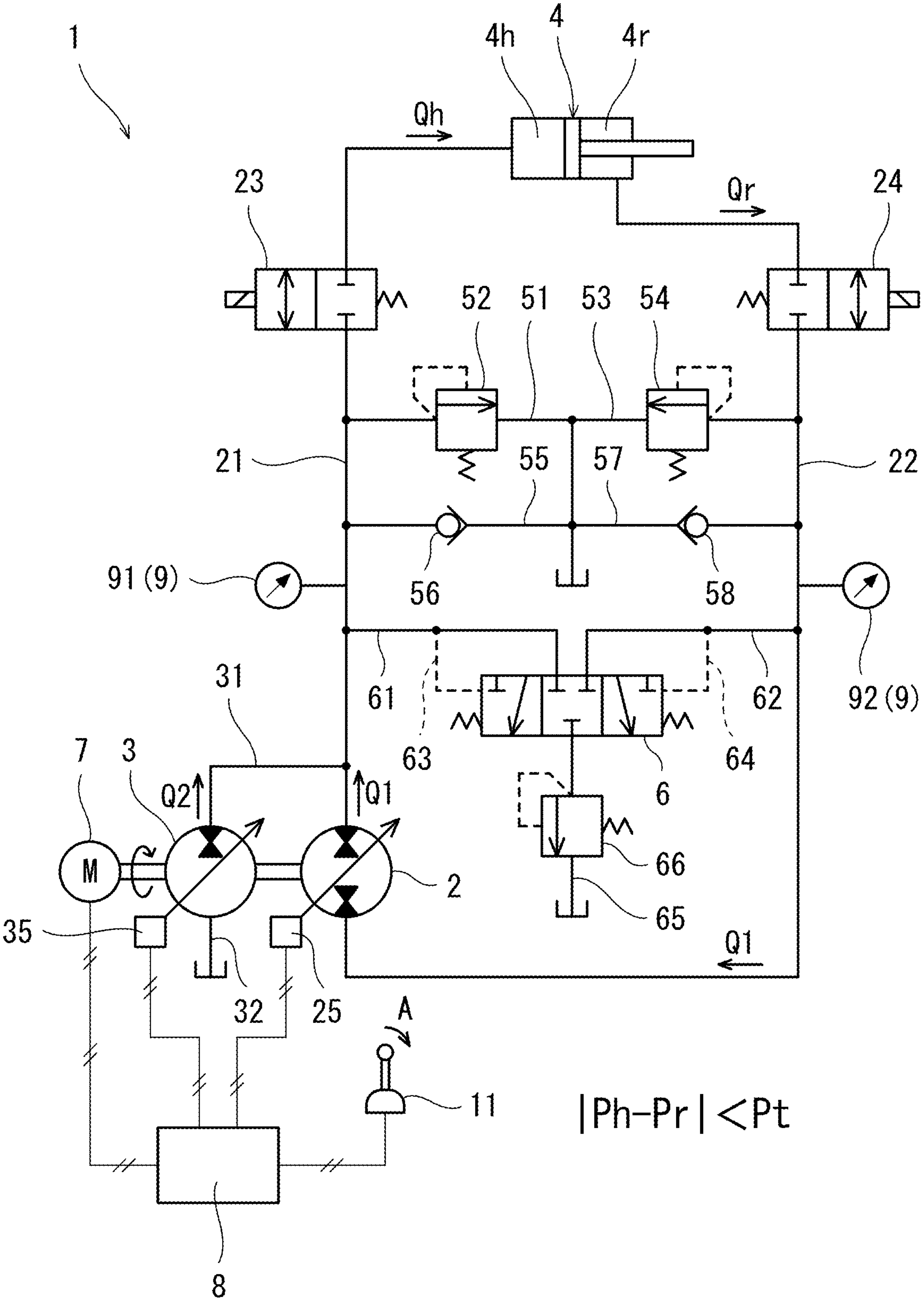
FIG. 3 shows a flow of a hydraulic liquid at the time of extending the cylinder in a case where a pressure difference between the pressure of a head-side chamber and the pressure of a rod-side chamber is less than a threshold.

FIG. 2 is a flowchart at the time of extending the single-rod cylinder 4. As shown in FIG. 3, when the operating lever of the operator 11 is tilted in a direction A, the first operation signal, which is an extension command to the single-rod cylinder 4, is inputted from the operator 11 to the control circuitry 8.

When the first operation signal is inputted to the control circuitry 8, the control circuitry 8 rotates the electric motor 7 in the first direction (step S1). As a result, the first bi-directional pump 2 and the second bi-directional pump 3 are driven in the first direction; the first bi-directional pump 2 sucks the hydraulic liquid through the rod-side line 22; and the second bi-directional pump 3 sucks the hydraulic liquid through the second supply/discharge line 32. Also, the first bi-directional pump 2 delivers the hydraulic liquid though the head-side line 21, and the second bi-directional pump 3 delivers the hydraulic liquid through the first supply/discharge line 31. That is, the hydraulic liquid delivered from the first bi-directional pump 2 and the hydraulic liquid delivered from the second bi-directional pump 3 merge together, which is supplied to the head-side chamber **4*h*. As described above, the first operation signal includes a speed command to the single-rod cylinder 4. Therefore, the control circuitry 8 rotates the electric motor 7** at a rotation speed N corresponding to the speed command.

Next, the control circuitry 8 obtains the position of the low-pressure selection valve 6, which is detected by the position detector 9 (step S2). In a case where the position of the low-pressure selection valve 6 is the neutral position, the control circuitry 8 controls the first regulator 25 such that a displacement q1 of the first bi-directional pump 2 is a first reference displacement qr1 (q1=qr1), and controls the second regulator 35 such that a displacement q2 of the second bi-directional pump 3 is a second reference displacement qr2 (q2=qr2) (step S3). For example, in a case where almost no load is applied to the single-rod cylinder 4 (e.g., in a case where the operating lever of the operator 11 is moved slowly), the position of the low-pressure selection valve 6 is the neutral position.

The first reference displacement qr1 is a displacement defined by a moving speed V of the single-rod cylinder 4, a pressure receiving area Ar of the rod-side chamber **4*r*, and the rotation speed N of the electric motor 7 (qr1=V×Ar/N). The second reference displacement qr2 is a result of multiplying the first reference displacement qr1 of the first bi-directional pump 2 by the ratio of a cross-sectional area Ac of the rod of the single-rod cylinder 4 to the pressure receiving area Ar of the rod-side chamber 4*r* (qr2=Ac/Ar×qr1). That is, in the case of q1=qr1 and q2=qr2, theoretically, there is neither excess nor deficiency in an inflow flow rate Qh to the single-rod cylinder 4 or in an outflow flow rate Qr from the single-rod cylinder 4**.

Therefore, unless there is a factor that causes a loss of balance among a delivery flow rate Q1 of the first bi-directional pump, a delivery flow rate Q2 of the second bi-directional pump 3, the inflow flow rate Qh to the single-rod cylinder 4, and the outflow flow rate Qr from the single-rod cylinder 4, the replenishment with the hydraulic liquid from the tank through the first bypass line 55 or the second bypass line 57 and the discharging of the hydraulic liquid into the tank through the first discharge line 61 or the second discharge line 62 are not performed. Examples of the factor that causes a loss of balance among the delivery flow rate Q1, the delivery flow rate Q2, the inflow flow rate Qh, and the outflow flow rate Qr include: performance of the first regulator 25 and that of the second regulator 35; efficiency of the first bi-directional pump 2 and that of the second bi-directional pump 3; leakage of the hydraulic liquid to the outside; and changes that occur over years.

That is, the inflow flow rate Qh to the head-side chamber **4*h* is the sum of the delivery flow rate Q1 of the first bi-directional pump 2 and the delivery flow rate Q2 of the second bi-directional pump 3. The delivery flow rate Q1 [L/min] of the first bi-directional pump 2 is a result of multiplying the displacement q1 [L/r] of the first bi-directional pump 2 by the rotation speed N [rpm], and the delivery flow rate Q2 [L/min] of the second bi-directional pump 3** is a result of multiplying the displacement q2 [L/r]

of the second bi-directional pump 3 by the rotation speed N [rpm]. The outflow flow rate Qr from the rod-side chamber 4*r* is equal to a suction flow rate Q1 of the first bi-directional pump 2.

Thereafter, when the stroke of the single-rod cylinder 4 has become a predetermined amount (YES in step S6), the control circuitry 8 stops the electric motor 7 (step S7). Examples of when the stroke of the single-rod cylinder 4 has become the predetermined amount include when inputting of the first operation signal from the operator 11 to the control circuitry 8 has stopped and when the single-rod cylinder 4 has moved to the stroke end.

On the other hand, in step S2, in a case where the position of the low-pressure selection valve 6 is the rod-side discharge position, the control circuitry 8 controls the first regulator 25 such that the displacement q1 of the first bi-directional pump 2 is less than the first reference displacement qr1 by a first predetermined amount Δq1 (q1=qr1−Δq1), and controls the second regulator 35 such that the displacement q2 of the second bi-directional pump 3 is greater than the second reference displacement qr2 by the first predetermined amountΔq1 (q2=qr2+Δq1) (step S4). The first predetermined amount Δq1 is determined by taking into account the aforementioned factor that causes a loss of balance among the delivery flow rate Q1, the delivery flow rate Q2, the inflow flow rate Qh, and the outflow flow rate Qr. For example, Δq1 is within the range of 1 to 10% of qr2.

For example, in a case where a load in the retracting direction is applied to the single-rod cylinder 4, the pressure Ph of the head-side chamber 4*h* becomes higher than the pressure Pr of the rod-side chamber 4*r* by the threshold Pt or greater, and the low-pressure selection valve 6 is switched to the rod-side discharge position.

Figure 4:
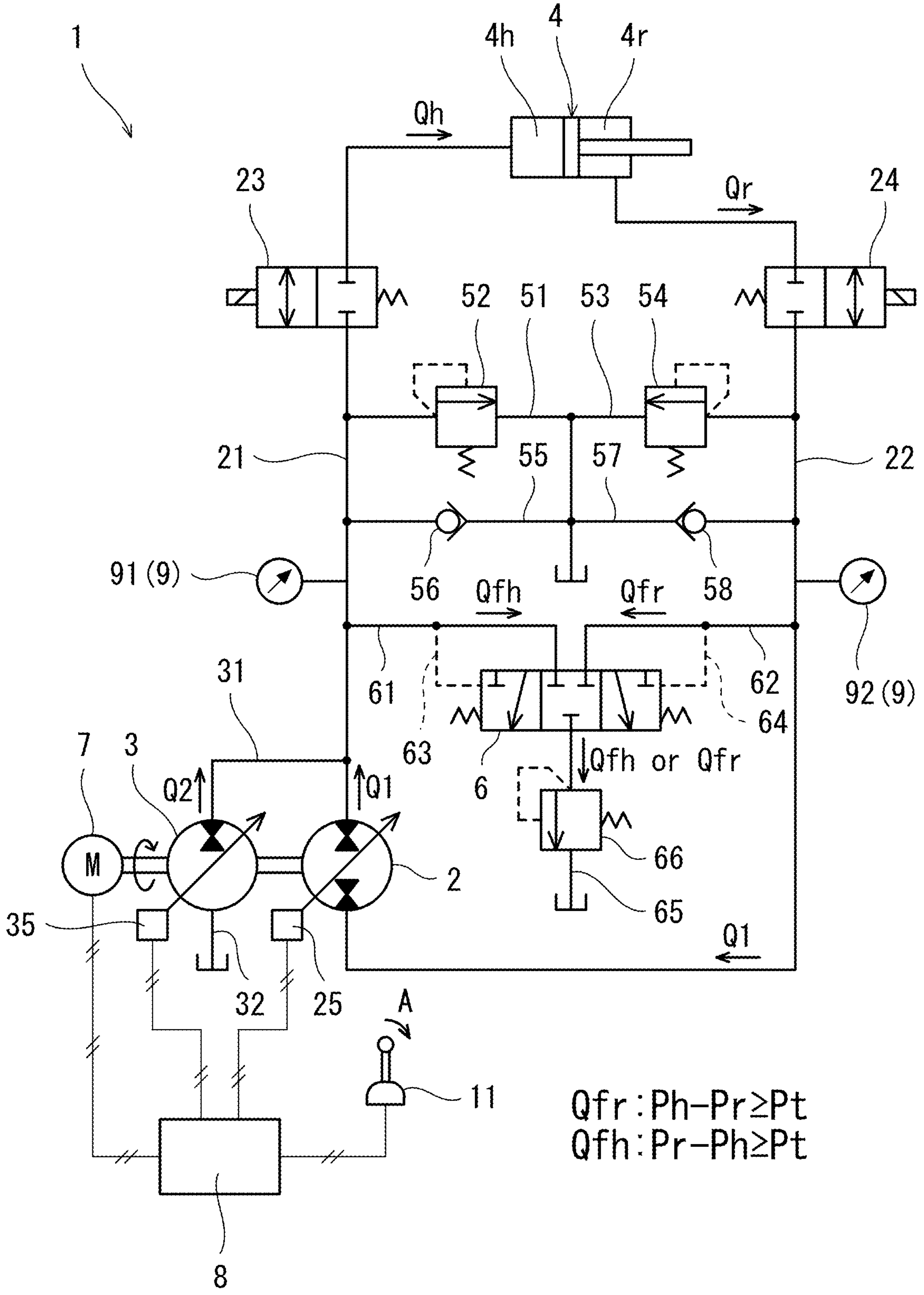
FIG. 4 shows a flow of the hydraulic liquid at the time of extending the cylinder in a case where the pressure difference between the pressure of the head-side chamber and the pressure of the rod-side chamber is greater than or equal to the threshold.

In step S4, the sum of the delivery flow rate Q1 of the first bi-directional pump 2 and the delivery flow rate Q2 of the second bi-directional pump 3 is the same as that in a case where the low-pressure selection valve 6 is in the neutral position. Accordingly, the moving speed of the single-rod cylinder 4 in step S4 is equal to the reference speed in the case of q1=qr1 and q2=qr2. Meanwhile, since the displacement q1 of the first bi-directional pump 2 is less than the first reference displacement qr1 by the first predetermined amount Δq1, as shown in FIG. 4, an excess amount Qfr corresponding to the first predetermined amount Δq1 is discharged from the rod-side line 22 through the second discharge line 62, the low-pressure selection valve 6, and the low-pressure relief line 65.

For example, in the case of q1=qr1 and q2=qr2, it is assumed that Qh=100, Qr=50, Q1=50, and Q2=50. When the position of the low-pressure selection valve 6 is the rod-side discharge position, if Q1=40 and Q2=60, then Qh=100, Qr=50, and Qfr=10.

Conversely, in step S2, in a case where the position of the low-pressure selection valve 6 is the head-side discharge position, the control circuitry 8 controls the first regulator 25 such that the displacement q1 of the first bi-directional pump 2 is the first reference displacement qr1 (q1=qr1), and controls the second regulator 35 such that the displacement q2 of the second bi-directional pump 3 is greater than the second reference displacement qr2 by a second predetermined amount Δq2 (q2=qr2+Δq2) (step S5). The second predetermined amount Δq2 is determined by taking into account the aforementioned factor that causes a loss of balance among the delivery flow rate Q1, the delivery flow rate Q2, the inflow flow rate Qh, and the outflow flow rate Qr. The second predetermined amount Δq2 may be the same as or different from the aforementioned first predetermined amount Δq1. For example, Δq2 is within the range of 1 to 10% of qr2.

For example, in a case where a load in the extending direction is applied to the single-rod cylinder 4, the pressure Pr of the rod-side chamber 4*r* becomes higher than the pressure Ph of the head-side chamber 4*h* by the threshold Pt or greater, and the low-pressure selection valve 6 is switched to the head-side discharge position.

In step S5, the suction flow rate Q1 of the first bi-directional pump 2 is the same as that in a case where the low-pressure selection valve 6 is in the neutral position. Accordingly, the moving speed of the single-rod cylinder 4 in step S5 is equal to the reference speed in the case of q1=qr1 and q2=qr2. Meanwhile, since the displacement q2 of the second bi-directional pump 3 is greater than the second reference displacement qr2 by the second predetermined amount Δq2, as shown in FIG. 4, an excess amount Qfh corresponding to the second predetermined amount Δq2 is discharged from the head-side line 21 through the first discharge line 61, the low-pressure selection valve 6, and the low-pressure relief line 65.

For example, similar to the above, in the case of q1=qr1 and q2=qr2, it is assumed that Qh=100, Qr=50, Q1=50, and Q2=50. When the position of the low-pressure selection valve 6 is the head-side discharge position, if Q1=50 and Q2=60, then Qr=50, Qh=100, and Qfh=10.

Both in a case where the position of the low-pressure selection valve 6 is the rod-side discharge position and in a case where the position of the low-pressure selection valve 6 is the head-side discharge position, when the stroke of the single-rod cylinder 4 has become the predetermined amount (YES in step S6), the control circuitry 8 stops the electric motor 7 (step S7).

(Cylinder Retraction)

Figure 5:
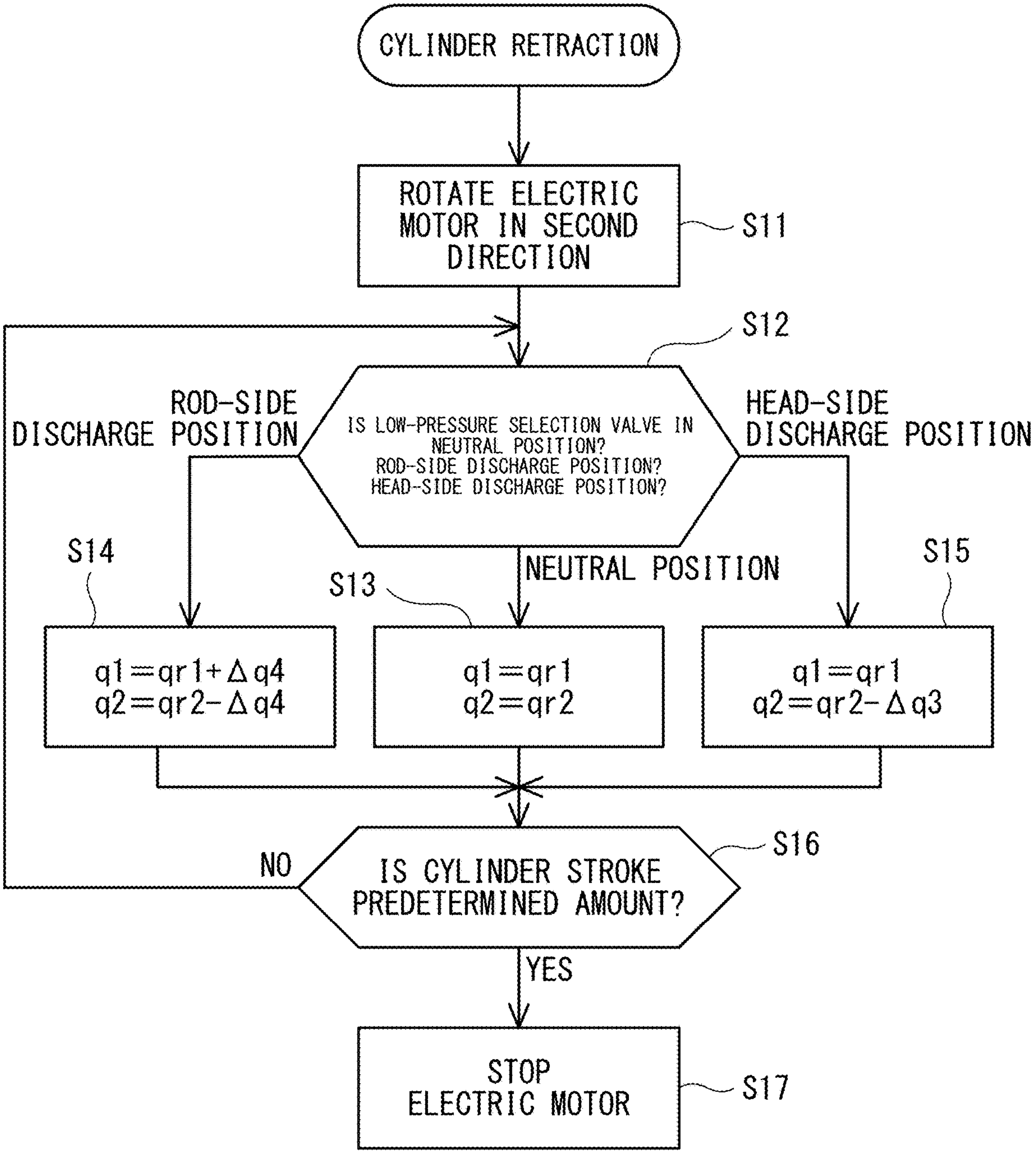
FIG. 5 is a flowchart at the time of retracting the cylinder.
Figure 6:
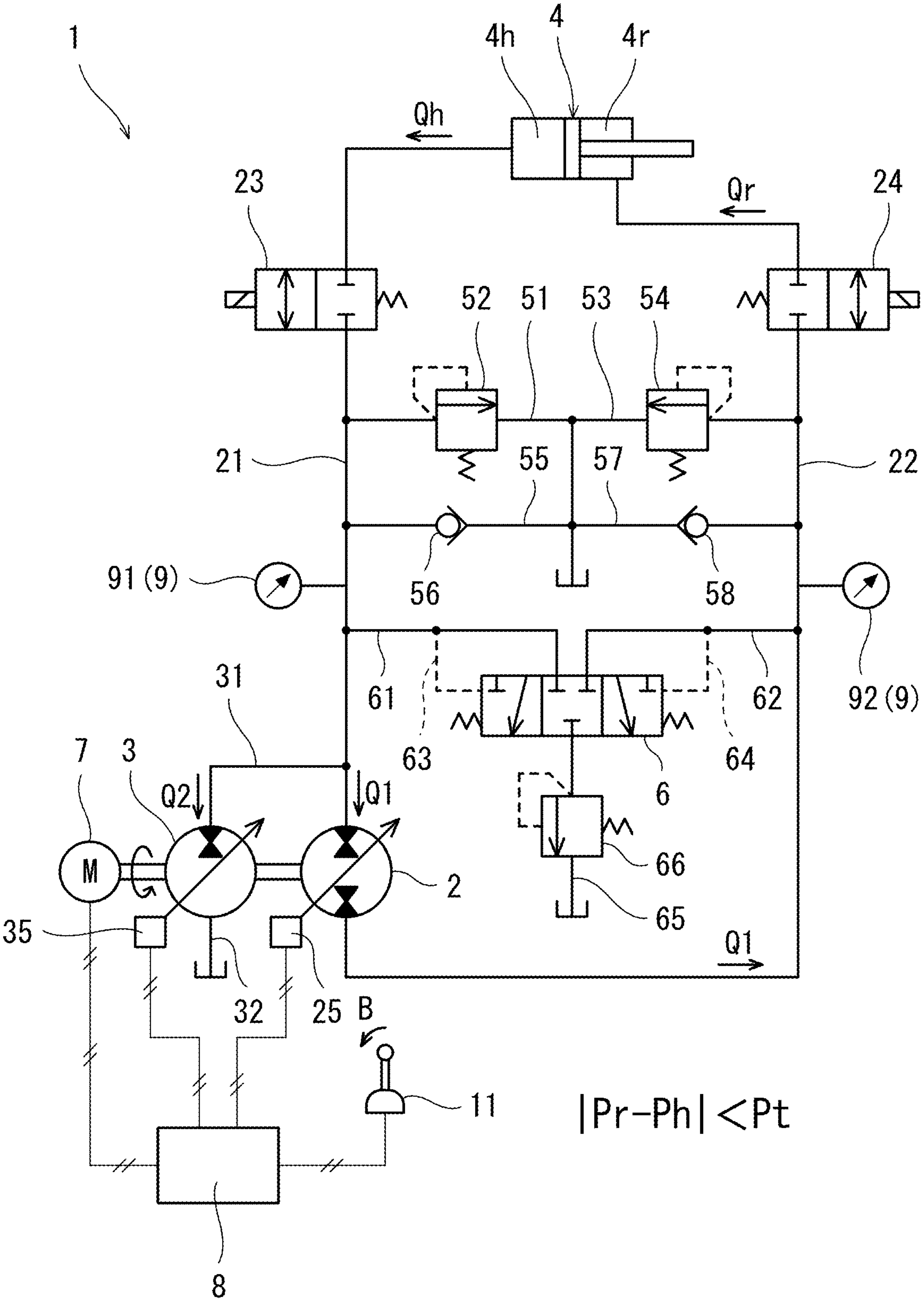
FIG. 6 shows a flow of the hydraulic liquid at the time of retracting the cylinder in a case where the pressure difference between the pressure of the head-side chamber and the pressure of the rod-side chamber is less than the threshold.

FIG. 5 is a flowchart at the time of retracting the single-rod cylinder 4. As shown in FIG. 6, when the operating lever of the operator 11 is tilted in a direction B, the second operation signal, which is a retraction command to the single-rod cylinder 4, is inputted from the operator 11 to the control circuitry 8.

When the second operation signal is inputted to the control circuitry 8, the control circuitry 8 rotates the electric motor 7 in the second direction (step S11). As a result, the first bi-directional pump 2 and the second bi-directional pump 3 are driven in the second direction; the first bi-directional pump 2 sucks the hydraulic liquid through the head-side line 21; and the second bi-directional pump 3 sucks the hydraulic liquid through the first supply/discharge line 31. That is, the hydraulic liquid that has flowed out from the head-side chamber 4*h* is divided into a portion flowing toward the first bi-directional pump 2 and a portion flowing toward the second bi-directional pump 3. Also, the first bi-directional pump 2 delivers the hydraulic liquid through the rod-side line 22, and the second bi-directional pump 3 delivers the hydraulic liquid through the second supply/discharge line 32. As described above, the second operation signal includes a speed command to the single-rod cylinder 4. Therefore, the control circuitry 8 rotates the electric motor 7 at a rotation speed N corresponding to the speed command.

Next, the control circuitry 8 obtains the position of the low-pressure selection valve 6, which is detected by the position detector 9 (step S12). In a case where the position of the low-pressure selection valve 6 is the neutral position, the control circuitry 8 controls the first regulator 25 such that the displacement q1 of the first bi-directional pump 2 is the first reference displacement qr1 (q1=qr1), and controls the second regulator 35 such that the displacement q2 of the second bi-directional pump 3 is the second reference displacement qr2 (q2=qr2) (step S13). For example, in a case where almost no load is applied to the single-rod cylinder 4 (e.g., in a case where the operating lever of the operator 11 is moved slowly), the position of the low-pressure selection valve 6 is the neutral position.

As described above, the first reference displacement qr1 is a displacement defined by the moving speed V of the single-rod cylinder 4, the pressure receiving area Ar of the rod-side chamber 4*r*, and the rotation speed N of the electric motor 7 (qr1=V×Ar/N). The second reference displacement qr2 is a result of multiplying the first reference displacement qr1 of the first bi-directional pump 2 by the ratio of the cross-sectional area Ac of the rod of the single-rod cylinder 4 to the pressure receiving area Ar of the rod-side chamber 4*r* (gr2=Ac/Ar×qr1). That is, in the case of q1=qr1 and q2=qr2, theoretically, there is neither excess nor deficiency in an inflow flow rate Qr to the single-rod cylinder 4 or in an outflow flow rate Qh from the single-rod cylinder 4.

Therefore, unless there is a factor that causes a loss of balance among the delivery flow rate Q1 of the first bi-directional pump, the delivery flow rate Q2 of the second bi-directional pump 3, the inflow flow rate Qr to the single-rod cylinder 4, and the outflow flow rate Qh from the single-rod cylinder 4, the replenishment with the hydraulic liquid from the tank through the first bypass line 55 or the second bypass line 57 and the discharging of the hydraulic liquid into the tank through the first discharge line 61 or the second discharge line 62 are not performed. Examples of the factor that causes a loss of balance among the delivery flow rate Q1, the delivery flow rate Q2, the inflow flow rate Qr, and the outflow flow rate Qh include: performance of the first regulator 25 and that of the second regulator 35; efficiency of the first bi-directional pump 2 and that of the second bi-directional pump 3; leakage of the hydraulic liquid to the outside; and changes that occur over years.

That is, the inflow flow rate Qr to the rod-side chamber 4*r* is equal to the delivery flow rate Q1 of the first bi-directional pump 2. The outflow flow rate Qh from the head-side chamber 4*h* is the sum of the suction flow rate Q1 of the first bi-directional pump 2 and a suction flow rate Q2 of the second bi-directional pump 3.

Thereafter, when the stroke of the single-rod cylinder 4 has become a predetermined amount (YES in step S16), the control circuitry 8 stops the electric motor 7 (step S17). Examples of when the stroke of the single-rod cylinder 4 has become the predetermined amount include when inputting of the second operation signal from the operator 11 to the control circuitry 8 has stopped and when the single-rod cylinder 4 has moved to the stroke end.

On the other hand, in step S12, in a case where the position of the low-pressure selection valve 6 is the head-side discharge position, the control circuitry 8 controls the first regulator 25 such that the displacement q1 of the first bi-directional pump 2 is the first reference displacement qr1 (q1=qr1), and controls the second regulator 35 such that the displacement q2 of the second bi-directional pump 3 is less than the second reference displacement qr2 by a third predetermined amount Δq3 (q2=qr2−Δq3) (step S15). The third predetermined amount Δq3 is determined by taking into account the aforementioned factor that causes a loss of balance among the delivery flow rate Q1, the delivery flow rate Q2, the inflow flow rate Qr, and the outflow flow rate Qh. The third predetermined amount Δq3 may be the same as either one of the first predetermined amount Δq1 or the second predetermined amount Δq2, or may be different from both the first predetermined amount Δq1 and the second predetermined amount Δq2. For example, Δq3 is within the range of 1 to 10% of qr2.

For example, in a case where a load in the extending direction is applied to the single-rod cylinder 4, the pressure Pr of the rod-side chamber 4*r* becomes higher than the pressure Ph of the head-side chamber 4*h* by the threshold Pt or greater, and the low-pressure selection valve 6 is switched to the head-side discharge position.

Figure 7:
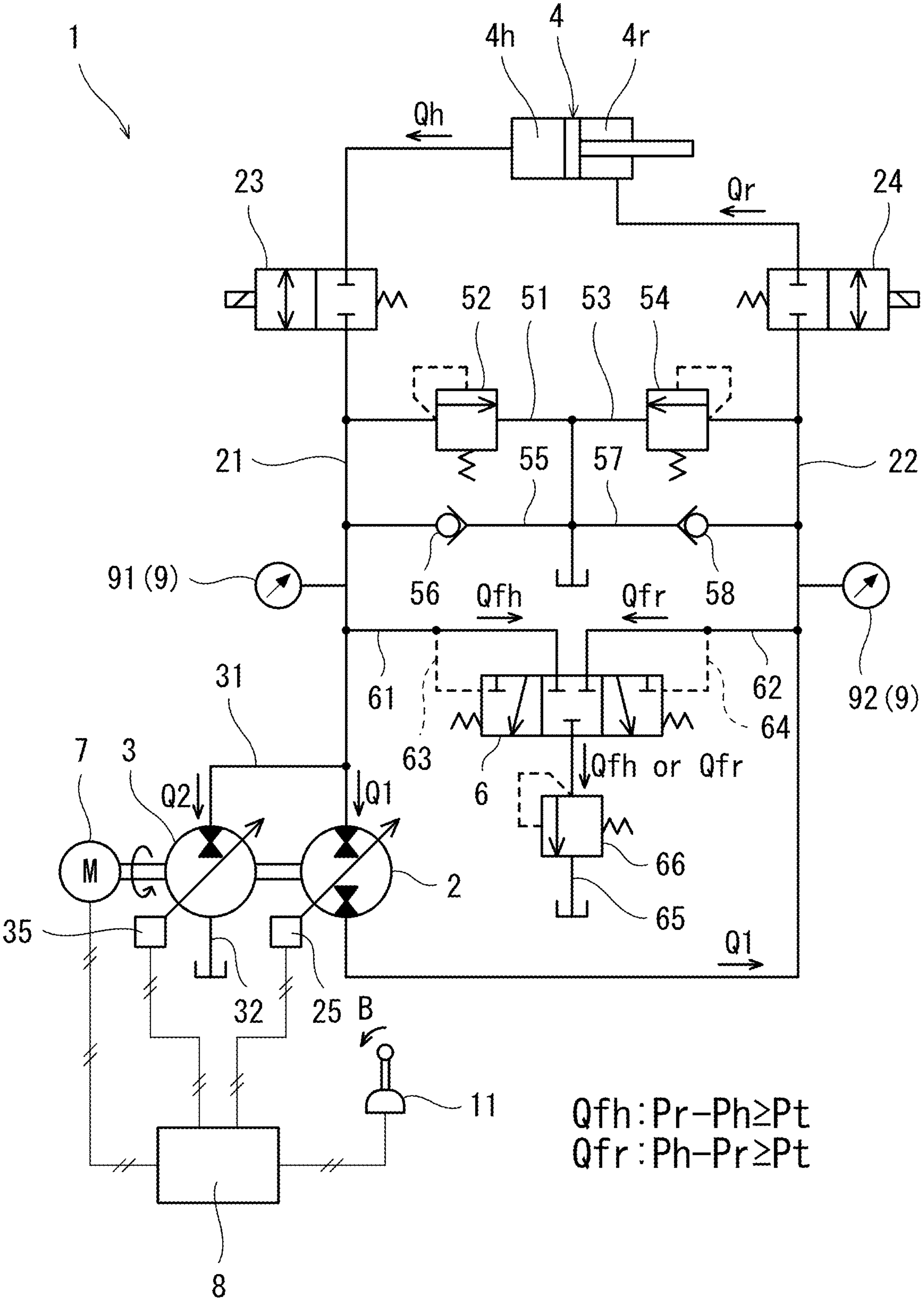
FIG. 7 shows a flow of the hydraulic liquid at the time of retracting the cylinder in a case where the pressure difference between the pressure of the head-side chamber and the pressure of the rod-side chamber is greater than or equal to the threshold.

In step S15, the delivery flow rate Q1 of the first bi-directional pump 2 is the same as that in a case where the low-pressure selection valve 6 is in the neutral position. Accordingly, the moving speed of the single-rod cylinder 4 in step S15 is equal to the reference speed in the case of q1=qr1 and q2=qr2. Meanwhile, since the displacement q2 of the second bi-directional pump 3 is less than the second reference displacement qr2 by the third predetermined amount Δq3, as shown in FIG. 7, the excess amount Qfh corresponding to the third predetermined amount Δq3 is discharged from the head-side line 21 through the first discharge line 61, the low-pressure selection valve 6, and the low-pressure relief line 65.

For example, in the case of q1=qr1 and q2=qr2, it is assumed that Qh=100, Qr=50, Q1=50, and Q2=50. When the position of the low-pressure selection valve 6 is the head-side discharge position, if Q1=50 and Q2=40, then Qr=50, Qh=100, and Qfh=10.

Conversely, in step S12, in a case where the position of the low-pressure selection valve 6 is the rod-side discharge position, the control circuitry 8 controls the first regulator 25 such that the displacement q1 of the first bi-directional pump 2 is greater than the first reference displacement qr1 by a fourth predetermined amount (q1=qr1+Δq4), and controls the second regulator 35 such that the displacement q2 of the second bi-directional pump 3 is less than the second reference displacement qr2 by the fourth predetermined amount Δq4 (q2=qr2−Δq4) (step S14). The fourth predetermined amount Δq4 is determined by taking into account the aforementioned factor that causes a loss of balance among the delivery flow rate Q1, the delivery flow rate Q2, the inflow flow rate Qr, and the outflow flow rate Qh. The fourth predetermined amount Δq4 may be the same as any one of the first predetermined amount Δq1, the second predetermined amount Δq2, or the third predetermined amount Δq3, or may be different from all of the first predetermined amount Δq1, the second predetermined amount Δq2, and the third predetermined amount Δq3. For example, Δq4 is within the range of 1 to 10% of qr2.

For example, in a case where a load in the retracting direction is applied to the single-rod cylinder 4, the pressure Ph of the head-side chamber 4*h* becomes higher than the pressure Pr of the rod-side chamber 4*r* by the threshold Pt or greater, and the low-pressure selection valve 6 is switched to the rod-side discharge position.

In step S14, the sum of the suction flow rate Q1 of the first bi-directional pump 2 and the suction flow rate Q2 of the second bi-directional pump 3 is the same as that in a case where the low-pressure selection valve 6 is in the neutral position. Accordingly, the moving speed of the single-rod cylinder 4 in step S14 is equal to the reference speed in the case of q1=qr1 and q2=qr2. Meanwhile, since the displacement q1 of the first bi-directional pump 2 is greater than the first reference displacement qr1 by the fourth predetermined amount Δq4, as shown in FIG. 7, the excess amount Qfr corresponding to the fourth predetermined amount Δq4 is discharged from the rod-side line 22 through the second discharge line 62, the low-pressure selection valve 6, and the low-pressure relief line 65.

For example, similar to the above, in the case of q1=qr1 and q2=qr2, it is assumed that Qh=100, Qr=50, Q1=50, and Q2=50. When the position of the low-pressure selection valve 6 is the rod-side discharge position, if Q1=60 and Q2=40, then Qh=100, Qr=50, and Qfr=10.

Both in a case where the position of the low-pressure selection valve 6 is the rod-side discharge position and in a case where the position of the low-pressure selection valve 6 is the head-side discharge position, when the stroke of the single-rod cylinder 4 has become the predetermined amount (YES in step S16), the control circuitry 8 stops the electric motor 7 (step S17).

As described above, since the hydraulic system 1 of the present embodiment includes the low-pressure selection valve 6, the hydraulic system 1 makes it possible to, in the configuration in which the second bi-directional pump 3 is added to the first bi-directional pump 2, physically prevent the occurrence of pressure confinement on either the rod side or the head side, whichever side has a lower pressure. In addition, since the position of the low-pressure selection valve 6 is detected by the position detector 9, various control can be performed based on the position of the low-pressure selection valve.

Further, in the present embodiment, the control as shown in the flowchart of FIG. 2 is performed. Therefore, at the time of extending the single-rod cylinder 4, even if the direction of the load is reversed and the low-pressure selection valve 6 is switched from the rod-side discharge position to the head-side discharge position or switched from the head-side discharge position to the rod-side discharge position, the moving speed of the single-rod cylinder 4 can be kept constant.

Still further, in the present embodiment, the control as shown in the flowchart of FIG. 5 is performed. Therefore, at the time of retracting the single-rod cylinder 4, even if the direction of the load is reversed and the low-pressure selection valve 6 is switched from the rod-side discharge position to the head-side discharge position or switched from the head-side discharge position to the rod-side discharge position, the moving speed of the single-rod cylinder 4 can be kept constant.

(Variations)

The present disclosure is not limited to the above-described embodiment. Various modifications can be made without departing from the scope of the present disclosure.

Figure 8:
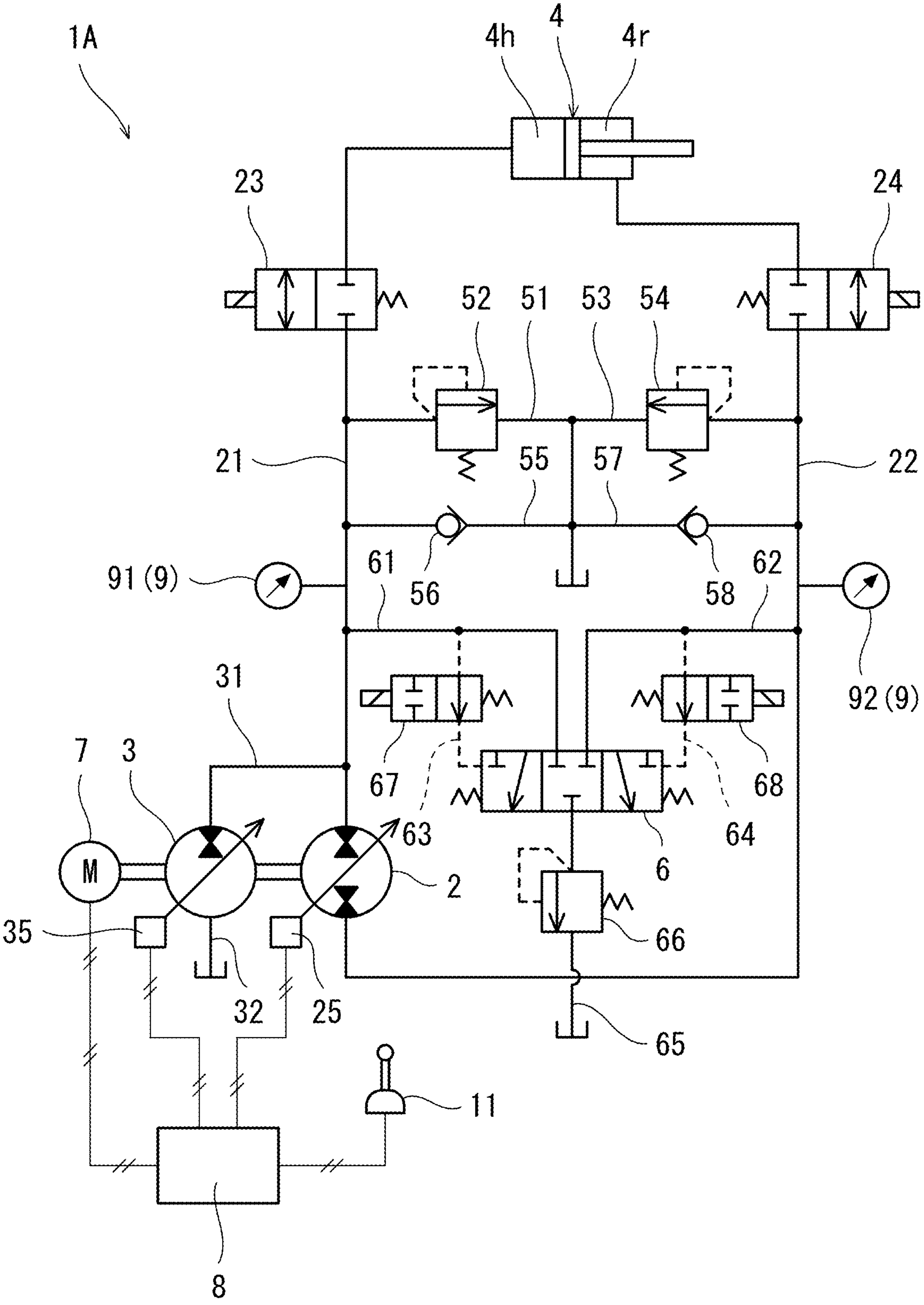
FIG. 8 shows a schematic configuration of a variation of the hydraulic system.
Figure 9:
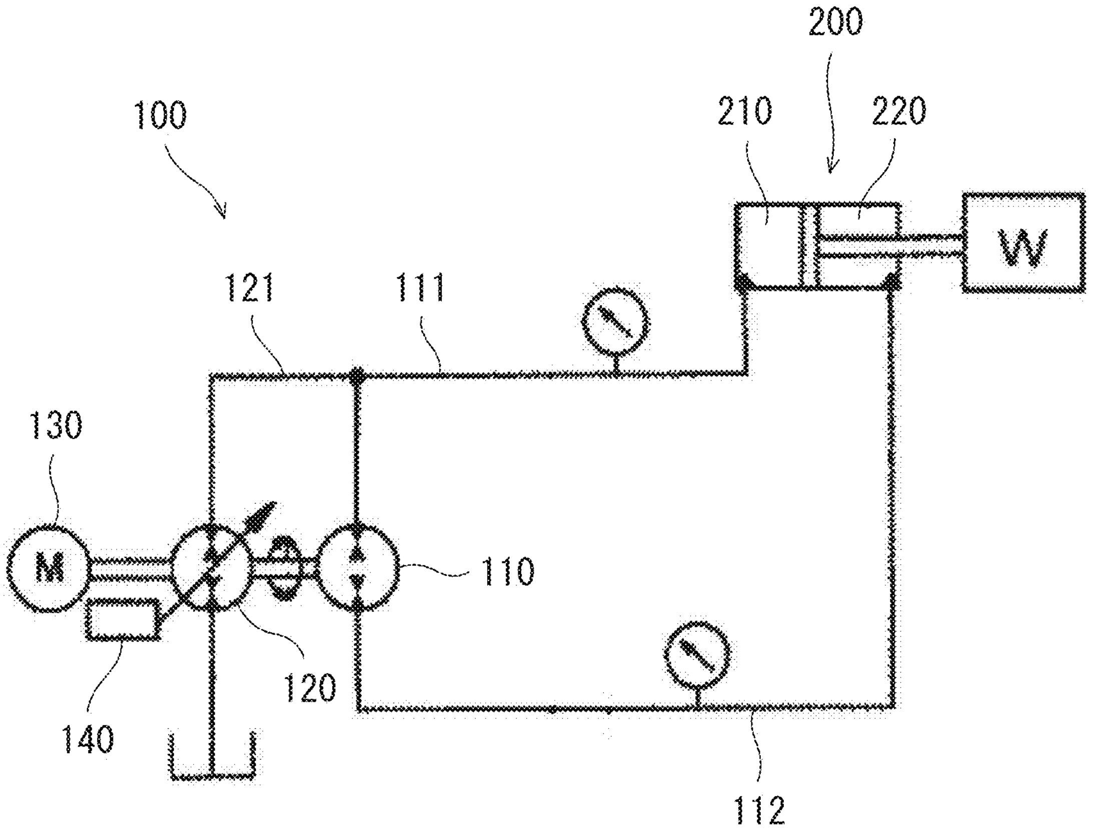
FIG. 9 PRIOR ART
FIG. 9 shows a schematic configuration of a conventional hydraulic system.

For example, as in a hydraulic system 1A shown in FIG. 8, which is a variation of the hydraulic system, a first on-off valve 67 may be located on the first pilot line 63, and a second on-off valve 68 may be located on the second pilot line 64. According to this configuration, in a situation where the magnitude relationship between the pressure Ph of the head-side chamber 4*h* and the pressure Pr of the rod-side chamber 4*r* is reversed, hunting of the low-pressure selection valve 6 can be prevented by closing the first on-off valve 67 and the second on-off valve 68.

(Summary)

The present disclosure provides, as a first mode, a hydraulic system for a single-rod cylinder including a head-side chamber and a rod-side chamber, the hydraulic system including: a first bi-directional pump connected to the head-side chamber by a head-side line and connected to the rod-side chamber by a rod-side line, the first bi-directional pump being a variable displacement pump; a second bi-directional pump connected to the head-side line by a supply/discharge line, the second bi-directional pump being a variable displacement pump; an electric motor that drives the first bi-directional pump and the second bi-directional pump in a same direction; a low-pressure selection valve connected to the head-side line by a first discharge line and connected to the rod-side line by a second discharge line, wherein when a pressure difference between a pressure of the head-side chamber and a pressure of the rod-side chamber is less than a threshold, the low-pressure selection valve is in a neutral position in which the low-pressure selection valve blocks the first discharge line and the second discharge line, and when the pressure of the head-side chamber is higher than the pressure of the rod-side chamber by the threshold or greater, the low-pressure selection valve is switched to a rod-side discharge position in which the low-pressure selection valve allows the second discharge line to communicate with a relief line on which a relief valve is located, whereas when the pressure of the rod-side chamber is higher than the pressure of the head-side chamber by the threshold or greater, the low-pressure selection valve is switched to a head-side discharge position in which the low-pressure selection valve allows the first discharge line to communicate with the relief line; and a position detector that detects whether a position of the low-pressure selection valve is the neutral position, the rod-side discharge position, or the head-side discharge position.

According to the above configuration, since the hydraulic system includes the low-pressure selection valve, the hydraulic system makes it possible to, in the configuration in which the second bi-directional pump is added to the first bi-directional pump, physically prevent the occurrence of pressure confinement on either the rod side or the head side, whichever side has a lower pressure. In addition, since the position of the low-pressure selection valve is detected by the position detector, various control can be performed based on the position of the low-pressure selection valve.

As a second mode, in the first mode, the hydraulic system may include: a first regulator that changes a displacement of the first bi-directional pump; a second regulator that changes a displacement of the second bi-directional pump; and control circuitry that controls the electric motor, the first regulator, and the second regulator. At a time of extending the single-rod cylinder, the control circuitry may control the first regulator and the second regulator such that: when the position of the low-pressure selection valve, which is detected by the position detector, is the neutral position, the displacement of the first bi-directional pump is a first reference displacement and the displacement of the second bi-directional pump is a second reference displacement; when the position of the low-pressure selection valve, which is detected by the position detector, is the rod-side discharge position, the displacement of the first bi-directional pump is less than the first reference displacement by a first predetermined amount and the displacement of the second bi-directional pump is greater than the second reference displacement by the first predetermined amount; and when the position of the low-pressure selection valve, which is detected by the position detector, is the head-side discharge position, the displacement of the first bi-directional pump is the first reference displacement and the displacement of the second bi-directional pump is greater than the second reference displacement by a second predetermined amount. According to this configuration, at the time of extending the single-rod cylinder, even if the direction of the load is reversed and the low-pressure selection valve is switched from the rod-side discharge position to the head-side discharge position or switched from the head-side discharge position to the rod-side discharge position, the moving speed of the single-rod cylinder can be kept constant.

As a third mode, in the first or second mode, the hydraulic system may include: a first regulator that changes a displacement of the first bi-directional pump; a second regulator that changes a displacement of the second bi-directional pump; and control circuitry that controls the electric motor, the first regulator, and the second regulator. At a time of retracting the single-rod cylinder, the control circuitry may control the first regulator and the second regulator such that: when the position of the low-pressure selection valve, which is detected by the position detector, is the neutral position, the displacement of the first bi-directional pump is a first reference displacement and the displacement of the second bi-directional pump is a second reference displacement; when the position of the low-pressure selection valve, which is detected by the position detector, is the head-side discharge position, the displacement of the first bi-directional pump is the first reference displacement and the displacement of the second bi-directional pump is less than the second reference displacement by a third predetermined amount; and when the position of the low-pressure selection valve, which is detected by the position detector, is the rod-side discharge position, the displacement of the first bi-directional pump is greater than the first reference displacement by a fourth predetermined amount and the displacement of the second bi-directional pump is less than the second reference displacement by the fourth predetermined amount. According to this configuration, at the time of retracting the single-rod cylinder, even if the direction of the load is reversed and the low-pressure selection valve is switched from the rod-side discharge position to the head-side discharge position or switched from the head-side discharge position to the rod-side discharge position, the moving speed of the single-rod cylinder can be kept constant.

As a fourth mode, in the second or third mode, for example, the second reference displacement may be a result of multiplying the first reference displacement by a ratio of a pressure receiving area of the rod-side chamber to a cross-sectional area of a rod of the single-rod cylinder.

As a fifth mode, in any one of the first to fourth modes, the hydraulic system may further include: a first lock valve located on the head-side line, the first lock valve being an on-off valve; and a second lock valve located on the rod-side line, the second lock valve being an on-off valve. According to this configuration, by closing the first lock valve and the second lock valve, movement of the single-rod cylinder can be locked.

As a sixth mode, in any one of the first to fifth modes, the pressure of the head-side chamber may be led to the low-pressure selection valve through a first pilot line, and the pressure of the rod-side chamber may be led to the low-pressure selection valve through a second pilot line, and the hydraulic system may further include: a first on-off valve located on the first pilot line; and a second on-off valve located on the second pilot line. According to this configuration, in a situation where the magnitude relationship between the pressure of the head-side chamber and the pressure of the rod-side chamber is reversed, hunting of the low-pressure selection valve can be prevented by closing the first on-off valve and the second on-off valve.

As a seventh mode, in any one of the first to sixth modes, the hydraulic system may further include: a head-side relief valve located on a head-side relief line that is branched off from the head-side line; a first check valve located on a first bypass line that bypasses the head-side relief valve; a rod-side relief valve located on a rod-side relief line that is branched off from the rod-side line; and a second check valve located on a second bypass line that bypasses the rod-side relief valve. According to this configuration, the pressure of the head-side chamber and the pressure of the rod-side chamber can be kept lower than or equal to a setting pressure of the relief valves, and also, the occurrence of cavitation on either the head side or the rod side, whichever side has a lower pressure, can be suppressed by replenishing the head-side line or the rod-side line with a hydraulic liquid via the corresponding check valve.

The invention claimed is:

1. A hydraulic system for a single-rod cylinder including a head-side chamber and a rod-side chamber, the hydraulic system comprising:

a first bi-directional pump connected to the head-side chamber by a head-side line and connected to the rod-side chamber by a rod-side line, the first bi-directional pump being a variable displacement pump;

a second bi-directional pump connected to the head-side line by a supply/discharge line, the second bi-directional pump being a variable displacement pump;

an electric motor that drives the first bi-directional pump and the second bi-directional pump in a same direction;

a low-pressure selection valve connected to the head-side line by a first discharge line and connected to the rod-side line by a second discharge line, wherein when a pressure difference between a pressure of the head-side chamber and a pressure of the rod-side chamber is less than a threshold, the low-pressure selection valve is in a neutral position in which the low-pressure selection valve blocks the first discharge line and the second discharge line, and when the pressure of the head-side chamber is higher than the pressure of the rod-side chamber by the threshold or greater, the low-pressure selection valve is switched to a rod-side discharge position in which the low-pressure selection valve allows the second discharge line to communicate with a relief line on which a relief valve is located, whereas when the pressure of the rod-side chamber is higher than the pressure of the head-side chamber by the threshold or greater, the low-pressure selection valve is switched to a head-side discharge position in which the low-pressure selection valve allows the first discharge line to communicate with the relief line;

a position detector that detects whether a position of the low-pressure selection valve is the neutral position, the rod-side discharge position, or the head-side discharge position;

a first regulator that changes a displacement of the first bi-directional pump;

a second regulator that changes a displacement of the second bi-directional pump; and control circuitry that controls the electric motor, the first regulator, and the second regulator, wherein at a time of extending the single-rod cylinder, the control circuitry controls the first regulator and the second regulator such that:

when the position of the low-pressure selection valve, which is detected by the position detector, is the neutral position, the displacement of the first bi-directional pump is a first reference displacement and the displacement of the second bi-directional pump is a second reference displacement;

when the position of the low-pressure selection valve, which is detected by the position detector, is the rod-side discharge position, the displacement of the first bi-directional pump is less than the first reference displacement by a first predetermined amount and the displacement of the second bi-directional pump is greater than the second reference displacement by the first predetermined amount; and when the position of the low-pressure selection valve, which is detected by the position detector, is the head-side discharge position, the displacement of the first bi-directional pump is the first reference displacement and the displacement of the second bi-directional pump is greater than the second reference displacement by a second predetermined amount.

2. The hydraulic system according to claim 1, wherein the second reference displacement is a result of multiplying the first reference displacement by a ratio of a pressure receiving area of the rod-side chamber to a cross-sectional area of a rod of the single-rod cylinder.

3. The hydraulic system according to claim 1, further comprising:

a first lock valve located on the head-side line, the first lock valve being an on-off valve; and a second lock valve located on the rod-side line, the second lock valve being an on-off valve.

4. The hydraulic system according to claim 1, further comprising:

a head-side relief valve located on a head-side relief line that is branched off from the head-side line;

a first check valve located on a first bypass line that bypasses the head-side relief valve;

a rod-side relief valve located on a rod-side relief line that is branched off from the rod-side line; and a second check valve located on a second bypass line that bypasses the rod-side relief valve.

5. The hydraulic system according to claim 1, wherein at a time of retracting the single-rod cylinder, the control circuitry controls the first regulator and the second regulator such that:

when the position of the low-pressure selection valve, which is detected by the position detector, is the neutral position, the displacement of the first bi-directional pump is the first reference displacement and the displacement of the second bi-directional pump is the second reference displacement;

when the position of the low-pressure selection valve, which is detected by the position detector, is the head-side discharge position, the displacement of the first bi-directional pump is the first reference displacement and the displacement of the second bi-directional pump is less than the second reference displacement by a third predetermined amount; and when the position of the low-pressure selection valve, which is detected by the position detector, is the rod-side discharge position, the displacement of the first bi-directional pump is greater than the first reference displacement by a fourth predetermined amount and the displacement of the second bi-directional pump is less than the second reference displacement by the fourth predetermined amount.

6. A hydraulic system for a single-rod cylinder including a head-side chamber and a rod-side chamber, the hydraulic system comprising:

a first bi-directional pump connected to the head-side chamber by a head-side line and connected to the rod-side chamber by a rod-side line, the first bi-directional pump being a variable displacement pump;

a second bi-directional pump connected to the head-side line by a supply/discharge line, the second bi-directional pump being a variable displacement pump;

an electric motor that drives the first bi-directional pump and the second bi-directional pump in a same direction;

a low-pressure selection valve connected to the head-side line by a first discharge line and connected to the rod-side line by a second discharge line, wherein when a pressure difference between a pressure of the head-side chamber and a pressure of the rod-side chamber is less than a threshold, the low-pressure selection valve is in a neutral position in which the low-pressure selection valve blocks the first discharge line and the second discharge line, and when the pressure of the head-side chamber is higher than the pressure of the rod-side chamber by the threshold or greater, the low-pressure selection valve is switched to a rod-side discharge position in which the low-pressure selection valve allows the second discharge line to communicate with a relief line on which a relief valve is located, whereas when the pressure of the rod-side chamber is higher than the pressure of the head-side chamber by the threshold or greater, the low-pressure selection valve is switched to a head-side discharge position in which the low-pressure selection valve allows the first discharge line to communicate with the relief line;

a position detector that detects whether a position of the low-pressure selection valve is the neutral position, the rod-side discharge position, or the head-side discharge position;

a first regulator that changes a displacement of the first bi-directional pump;

a second regulator that changes a displacement of the second bi-directional pump; and control circuitry that controls the electric motor, the first regulator, and the second regulator, wherein at a time of retracting the single-rod cylinder, the control circuitry controls the first regulator and the second regulator such that:

when the position of the low-pressure selection valve, which is detected by the position detector, is the neutral position, the displacement of the first bi-directional pump is a first reference displacement and the displacement of the second bi-directional pump is a second reference displacement;

when the position of the low-pressure selection valve, which is detected by the position detector, is the head-side discharge position, the displacement of the first bi-directional pump is the first reference displacement and the displacement of the second bi-directional pump is less than the second reference displacement by a third predetermined amount; and when the position of the low-pressure selection valve, which is detected by the position detector, is the rod-side discharge position, the displacement of the first bi-directional pump is greater than the first reference displacement by a fourth predetermined amount and the displacement of the second bi-directional pump is less than the second reference displacement by the fourth predetermined amount.

7. The hydraulic system according to claim 6, further comprising:

a first lock valve located on the head-side line, the first lock valve being an on-off valve; and a second lock valve located on the rod-side line, the second lock valve being an on-off valve.

8. The hydraulic system according to claim 6, further comprising:

a head-side relief valve located on a head-side relief line that is branched off from the head-side line;

a first check valve located on a first bypass line that bypasses the head-side relief valve;

a rod-side relief valve located on a rod-side relief line that is branched off from the rod-side line; and a second check valve located on a second bypass line that bypasses the rod-side relief valve.

9. A hydraulic system for a single-rod cylinder including a head-side chamber and a rod-side chamber, the hydraulic system comprising:

a first bi-directional pump connected to the head-side chamber by a head-side line and connected to the rod-side chamber by a rod-side line, the first bi-directional pump being a variable displacement pump;

a second bi-directional pump connected to the head-side line by a supply/discharge line, the second bi-directional pump being a variable displacement pump;

an electric motor that drives the first bi-directional pump and the second bi-directional pump in a same direction;

a low-pressure selection valve connected to the head-side line by a first discharge line and connected to the rod-side line by a second discharge line, wherein when a pressure difference between a pressure of the head-side chamber and a pressure of the rod-side chamber is less than a threshold, the low-pressure selection valve is in a neutral position in which the low-pressure selection valve blocks the first discharge line and the second discharge line, and when the pressure of the head-side chamber is higher than the pressure of the rod-side chamber by the threshold or greater, the low-pressure selection valve is switched to a rod-side discharge position in which the low-pressure selection valve allows the second discharge line to communicate with a relief line on which a relief valve is located, whereas when the pressure of the rod-side chamber is higher than the pressure of the head-side chamber by the threshold or greater, the low-pressure selection valve is switched to a head-side discharge position in which the low-pressure selection valve allows the first discharge line to communicate with the relief line;

a position detector that detects whether a position of the low-pressure selection valve is the neutral position, the rod-side discharge position, or the head-side discharge position, wherein the pressure of the head-side chamber is led to the low-pressure selection valve through a first pilot line, and the pressure of the rod-side chamber is led to the low-pressure selection valve through a second pilot line, and the hydraulic system further comprises:

a first on-off valve located on the first pilot line; and a second on-off valve located on the second pilot line.

* * * * *